(12) United States Patent
Tsunoda

(10) Patent No.: US 12,477,217 B2
(45) Date of Patent: Nov. 18, 2025

(54) INFORMATION PROCESSING APPARATUS AND CONTROL METHOD THEREFOR

(71) Applicant: CANON KABUSHIKI KAISHA, Tokyo (JP)

(72) Inventor: Masayoshi Tsunoda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/639,222

(22) Filed: Apr. 18, 2024

(65) Prior Publication Data
US 2024/0365000 A1 Oct. 31, 2024

(30) Foreign Application Priority Data
Apr. 26, 2023 (JP) ................. 2023-072666

(51) Int. Cl.
*H04N 23/66* (2023.01)
*H04N 23/62* (2023.01)

(52) U.S. Cl.
CPC ............ *H04N 23/66* (2023.01); *H04N 23/62* (2023.01)

(58) Field of Classification Search
CPC ....... H04N 23/62; H04N 23/66; H04N 23/661
See application file for complete search history.

(56) References Cited

U.S. PATENT DOCUMENTS

| | | | | |
|---|---|---|---|---|
| 8,619,159 B2* | 12/2013 | Nakamura | ......... | H04N 1/32101 348/231.5 |
| 8,687,939 B2* | 4/2014 | Ohashi | ................. | H04N 23/631 386/230 |
| 10,158,795 B2* | 12/2018 | Okazaki | ............ | H04M 1/72469 |
| 11,782,578 B2* | 10/2023 | Otsuhata | ........... | H04M 1/72409 715/746 |
| 12,360,656 B2* | 7/2025 | Kang | ..................... | G06F 3/1454 |
| 12,374,447 B1* | 7/2025 | Schweinfurth | ........ | G16H 40/40 |
| 2013/0159917 A1* | 6/2013 | Loebach | ............... | G06F 3/0488 715/778 |
| 2014/0267795 A1* | 9/2014 | Iwasaki | ................ | H04N 23/632 348/207.1 |
| 2014/0354837 A1* | 12/2014 | Okazaki | ................. | H04N 23/66 348/211.2 |
| 2015/0358572 A1* | 12/2015 | Nagae | .................. | H04N 23/741 348/143 |

(Continued)

FOREIGN PATENT DOCUMENTS

| | | |
|---|---|---|
| JP | 2013097758 A | 5/2013 |
| JP | 2014120824 A | 6/2014 |

*Primary Examiner* — Pritham D Prabhakher
(74) *Attorney, Agent, or Firm* — Cowan, Liebowitz & Latman, P.C.

(57) ABSTRACT

An information processing apparatus stores first setting information in association with an identification of a first electronic device, the first setting information having been set on the first electronic device and received from the first electronic device via a communication circuitry. The apparatus transmits setting information that has been selected from a list to a second electronic device for setting on the second electronic device. In a case where information indicating a completion of the setting has been received from the second electronic device after the transmission, the apparatus updates the selected setting information by associating second setting information and an identification of the second electronic device.

7 Claims, 12 Drawing Sheets

(56) References Cited

U.S. PATENT DOCUMENTS

| | | | |
|---|---|---|---|
| 2018/0081909 A1* | 3/2018 | Higashibeppu | G06F 16/5866 |
| 2018/0173543 A1* | 6/2018 | Ukegawa | H04N 1/00509 |
| 2019/0020806 A1* | 1/2019 | Okazaki | H04M 1/72412 |
| 2022/0091705 A1* | 3/2022 | Otsuhata | G06F 3/0482 |
| 2022/0201196 A1* | 6/2022 | Nagai | H04N 23/64 |
| 2024/0133101 A1* | 4/2024 | Choi | D06F 34/05 |
| 2024/0229320 A9* | 7/2024 | Choi | H04L 12/2816 |

* cited by examiner

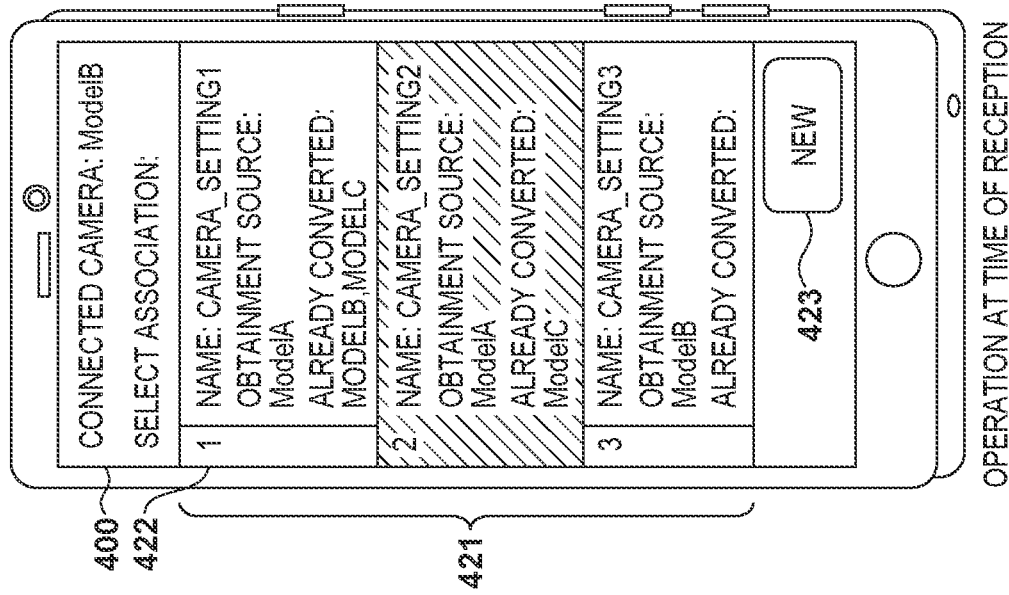
FIG. 4D  OPERATION AT TIME OF RECEPTION
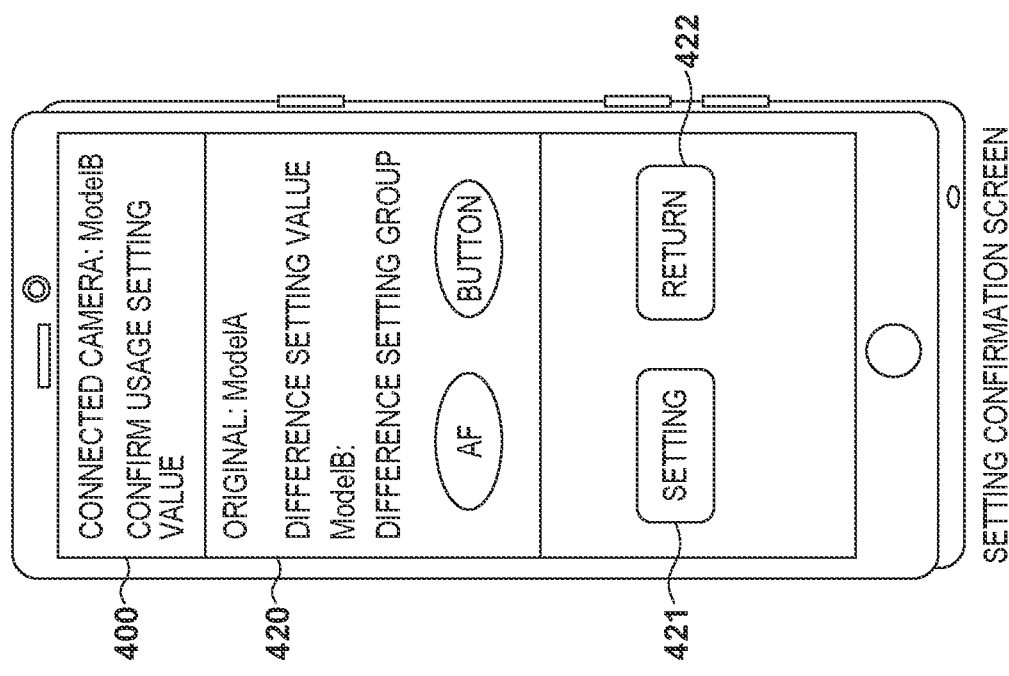
FIG. 4C  SETTING CONFIRMATION SCREEN

F I G. 6A

COMMUNICATION INFORMATION

| SETTING VALUE DATA | SMARTPHONE ↔ CAMERA |
|---|---|
| SETTING VALUE IDENTIFIER | SMARTPHONE ↔ CAMERA |
| SETTING VALUE Ver | SMARTPHONE ↔ CAMERA |

F I G. 6B

CONTROL COMBINATIONS ACCORDING TO COMMUNICATION INFORMATION

| OPERATION UNIT | NORMAL ASSOCIATION | FORCED ASSOCIATION | NEW STORAGE | CONTROL ON SMARTPHONE |
|---|---|---|---|---|
| REQUEST INFORMATION | Put | Put | Put | Get |
| SETTING VALUE DATA | ALL/DIFFERENCE POSSIBLE | ALL/DIFFERENCE POSSIBLE | ALL | ANY |
| UPDATE IDENTIFIER | UPDATE IDENTIFIER | UPDATE IDENTIFIER | NONE | ANY |

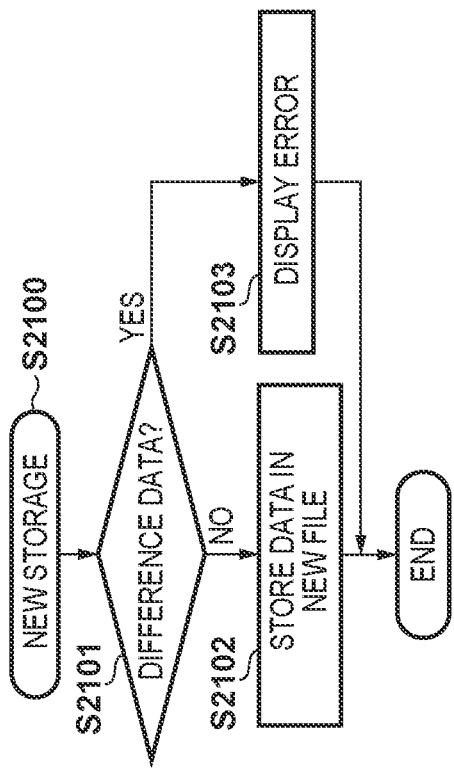
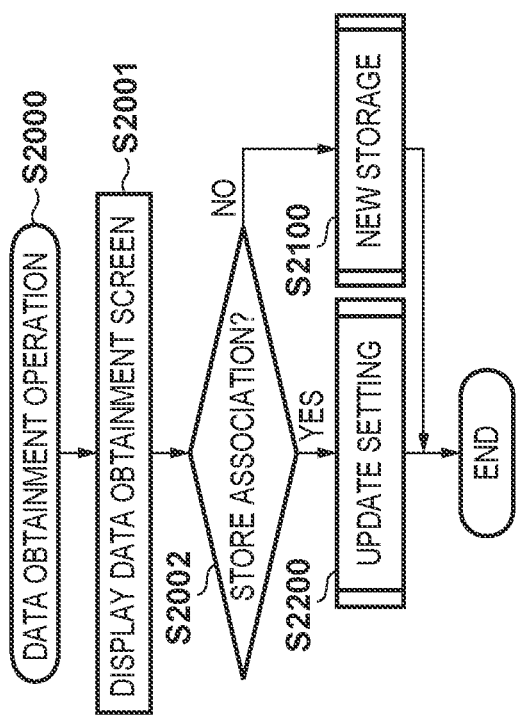
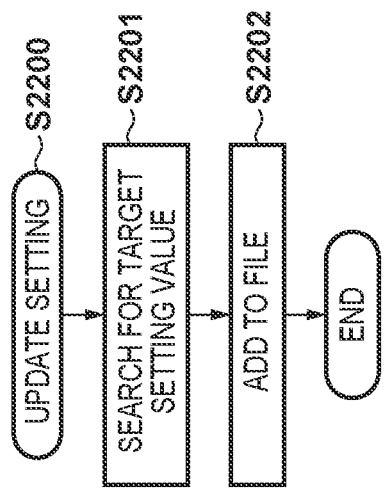

INFORMATION PROCESSING APPARATUS AND CONTROL METHOD THEREFOR

BACKGROUND OF THE INVENTION

Field of the Invention

The present invention relates to an information processing apparatus and a control method therefor, and to a technique that assists setting of an electronic device.

Description of the Related Art

Conventionally, setting data of a new electronic device can easily be set by using setting data of another model. For example, Japanese Patent Laid-Open No. 2014-120824 discloses a system that, when settable ranges of two electronic devices differ from each other, allows setting ranges to be changed on the electronic devices via a user operation. Also, Japanese Patent Laid-Open No. 2013-97758 discloses a method of configuring basic settings based on a setting policy when the settings are configured on another electronic device.

However, for example, in a case where setting values have been corrected on a target electronic device, setting information after the correction cannot be re-used on another electronic device; thus, there has been room for improvements in convenience.

SUMMARY OF THE INVENTION

The present disclosure, in one aspect thereof, provides an information processing apparatus that can improve the aforementioned issues with conventional techniques, and a control method therefor.

According to an aspect of the present invention, there is provided an information processing apparatus, comprising: a storage device that stores first setting information in association with an identification of a first electronic device, the first setting information having been set on the first electronic device and received from the first electronic device via a communication circuitry; a display device that displays a list of pieces of setting information stored in the storage device in a selectable manner; and a setting controller that transmits setting information that has been selected from the list to a second electronic device via the communication circuitry for setting on the second electronic device, the second electronic device being different from the first electronic device, wherein in a case where information indicating a completion of the setting has been received from the second electronic device after the selected setting information has been transmitted to the second electronic device, the setting controller updates the storage device by associating second setting information and an identification of the second electronic device that have been received from the second electronic device with the selected setting information stored in the storage device, and the list of pieces of setting information displayed on the display device includes pieces of information related to the first electronic device and the second electronic device.

According to another aspect of the present invention, there is provided a control method for an information processing apparatus that includes storage device that stores first setting information in association with an identification of a first electronic device, the first setting information having been set on the first electronic device and received from the first electronic device via communication circuitry, the control method comprising: displaying a list of pieces of setting information stored in the storage device in a selectable manner; transmitting setting information that has been selected from the list of pieces of setting information to a second electronic device via the communication circuitry for setting on the second electronic device, the second electronic device being different from the first electronic device; and in a case where information indicating a completion of the setting has been received from the second electronic device, updating the storage device by associating second setting information and an identification of the second electronic device that have been received from the second electronic device with the selected setting information stored in the storage device, wherein the list of pieces of setting information includes pieces of information related to the first electronic device and the second electronic device.

According to a further aspect of the present invention, there is provided a non-transitory computer-readable medium storing a program that, when executed by a computer, causes the computer to perform the method according to the present invention.

Further features of the present invention will become apparent from the following description of exemplary embodiments (with reference to the attached drawings).

BRIEF DESCRIPTION OF THE DRAWINGS

FIG. 4A to FIG. 4D are diagrams showing examples of a screen displayed while the smartphone is being operated in the embodiment.

FIG. 6A and FIG. 6B are diagrams showing examples of communication information that is used in communication between the smartphone and the camera in the embodiment.

FIG. 9A to FIG. 9C are flowcharts showing subroutines executed by the smartphone according to the embodiment.

DESCRIPTION OF THE EMBODIMENTS

Figure 1:
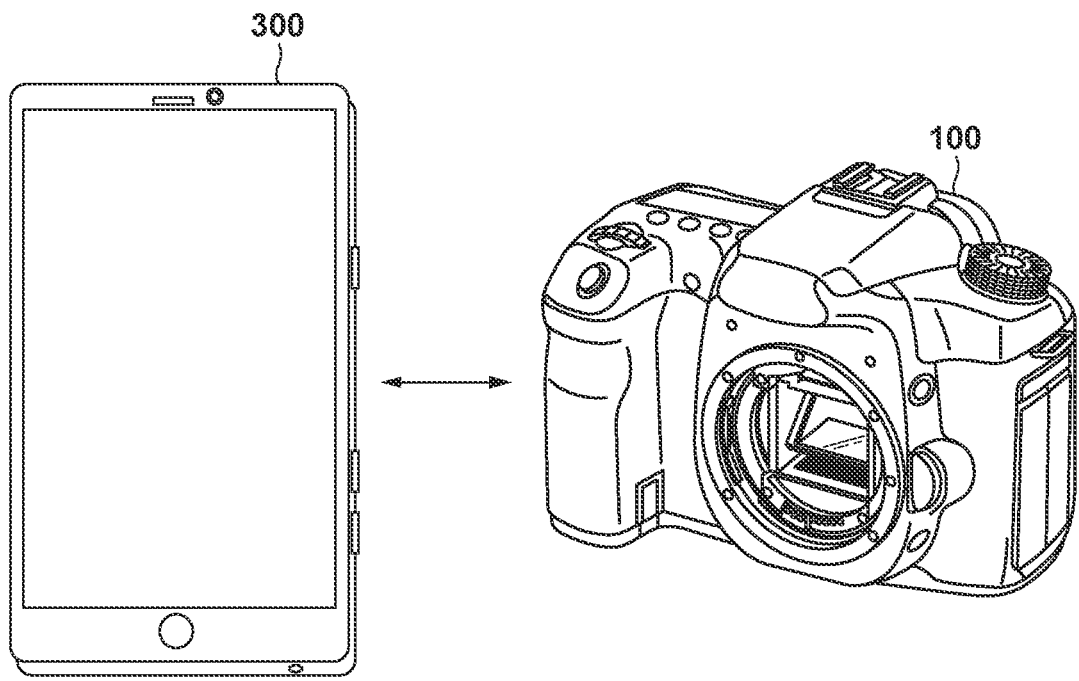
FIG. 1 is a system diagram according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram of a system configuration that uses a camera 100, which is an image capturing apparatus, and a smartphone 300 according to the present embodiment. The smartphone 300 and the camera 100 are connected in such a way that they can communicate with each other. The connection between the smartphone 300 and the camera 100 may be connection that uses a wired cable such as a USB or LAN cable, or may be wireless connection via Wi-Fi, Bluetooth®, or the like; the mode of connection is not limited in particular. Also, regarding a communication protocol to be used for the communication, any of such communication protocols as PTP and HTTP may be used; the communication protocol is not limited in particular, either.

Figure 2:
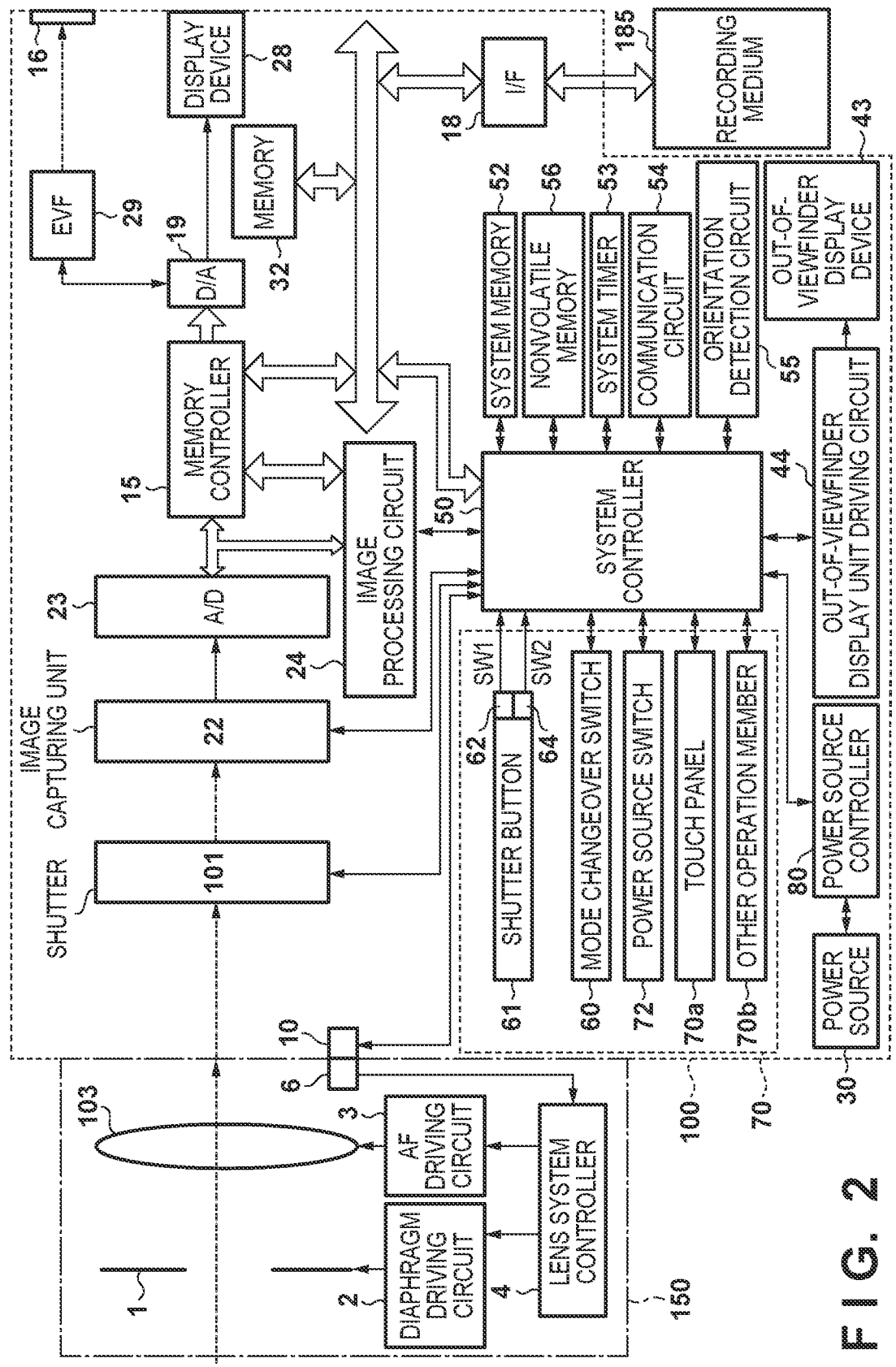
FIG. 2 is a configuration diagram of a camera according to the embodiment.

FIG. 2 shows a block configuration diagram of the camera 100 and a lens unit 150 according to the present embodiment. Note, although it is assumed that the lens unit 150 is attachable to and detachable from the camera 100 according to the embodiment, the lens unit 150 and the camera 100 may be integrated.

Although the lens unit 150 is normally composed of a plurality of lenses, one lens 103 is shown thereas in FIG. 2. The lens unit 150 includes a terminal 6. The camera 100 is also provided with a terminal 10. Then, when the lens unit 150 has been attached to the camera 100, the terminal 6 and the terminal 10 are placed in an electrically connected state, and the lens unit 150 receives power from the camera 100 and becomes capable of mutually communicating with the camera 100. With use of an internal lens system control circuit 4, the lens unit 150 controls a diaphragm 1 via a diaphragm driving circuit 2. Also, with use of the lens system control circuit 4, the lens unit 150 achieves focus by changing the position of the lens 103 via an AF driving circuit.

A shutter 101 is a focal-plane shutter that can freely control an exposure period of an image capturing unit 22 under control of a system controller 50. The image capturing unit 22 includes an image sensor composed of, for example, a CCD or CMOS element that convers optical images into electrical signals. The image capturing unit 22 may include an imaging plane phase-difference detection sensor that outputs defocus amount information to the system controller 50. An A/D converter 23 converts analog signals output from the image capturing unit 22 into digital signals.

An image processing circuit 24 executes predetermined processing (pixel interpolation, resize processing such as reduction, color conversion processing, and the like) with respect to data from the A/D converter 23 or data from a memory controller 15. Also, the image processing circuit 24 executes predetermined computation processing with use of captured image data, and the system controller 50 performs exposure control and range-finding control based on the computation result obtained from the image processing circuit 24. As a result, autofocus (AF) processing, automatic exposure (AE) processing, preliminary flash emission (EF) processing, and the like of a through-the-lens (TTL) method are executed. The image processing circuit 24 further executes predetermined computation processing with use of captured image data, and executes auto white balance (AWB) processing of the TTL method based on the obtained computation result.

Data output from the A/D converter 23 is written to a memory 32 via the image processing circuit 24 and the memory controller 15. Alternatively, output data from the A/D converter 23 is written to the memory 32 via the memory controller 15 without intervention of the image processing circuit 24. The memory 32 stores image data that has been obtained by the image capturing unit 22 and converted into digital data by the A/D converter 23, and image data to be displayed on a display device 28 and an EVF 29. The memory 32 has a storage capacity sufficient to store a predetermined number of still images, and moving images and sounds of a predetermined length of time.

Furthermore, the memory 32 also functions as a memory for image display (a video memory). A D/A converter 19 converts data for image display stored in the memory 32 into analog signals, and supplies the analog signals to the display device 28 and the EVF 29. Consequently, the image data for display that has been written to the memory 32 is displayed on the display device 28 and the EVF 29 via the D/A converter 19. Each of the display device 28 and the EVF 29 is a display such as an LCD and an organic EL, and performs display corresponding to analog signals from the D/A converter 19. Digital signals that have undergone the A/D conversion performed by the A/D converter 23 and have been accumulated in the memory 32 are converted into analog signals by the D/A converter 19, and are sequentially transferred to and displayed on the display device 28 or the EVF 29; in this way, live-view display (LV) can be performed. Hereinafter, images that are displayed through live-view display will be referred to as live-view images (LV images).

The system controller 50 is composed of at least one processor and/or at least one circuit, and controls the entirety of the camera 100. The system controller 50 is a processor and is also a circuit. The system controller 50 realizes each type of processing according to the present embodiment, which will be described later, by executing a program recorded in a nonvolatile memory 56. Furthermore, the system controller 50 also performs display control by controlling the memory 32, D/A converter 19, display device 28, EVF 29, and the like.

A system memory 52 is, for example, a RAM. The system controller 50 deploys constants and variables for the operations of the system controller 50, the program that has been read out from the nonvolatile memory 56, and the like to the system memory 52. Then, the system controller 50 executes the program deployed to the system memory 52.

The nonvolatile memory 56 is an electrically erasable and recordable memory, and is, for example, an EEPROM or the like. Constants for the operations of the system controller 50, the program, operation member arrangement information, and the like are recorded in the nonvolatile memory 56. The program mentioned here denotes a program for executing various types of flowcharts, which will be described later, in the present embodiment.

A system timer 53 is a time measurement unit that measures time periods used in various types of control, and the time of a built-in clock.

A communication circuit 54 exchanges, for example, various types of data such as video signals, sound signals, and commands with an external device (the smartphone 300 in the embodiment) that is connected wirelessly or via a wired cable. The communication circuit 54 can also connect to a wireless local area network (LAN) and the Internet. Furthermore, the communication circuit 54 can communicate with the external device also via Bluetooth® and Bluetooth® Low Energy. The communication circuit 54 can transmit images captured by the image capturing unit 22 (including LV images) and images recorded in a recording medium 200, and can also receive image data and various types of other information from the external device.

An orientation detection circuit 55 detects the orientation of the camera 100 relative to the gravity direction. Based on the orientation detected by the orientation detection circuit 55, the system controller 50 can determine whether an image shot by the image capturing unit 22 is an image that has been shot while holding the camera vertically or horizontally (landscape or portrait). The system controller 50 can add information indicating the determined orientation to an image file of an image captured by the image capturing unit 22, and record the image in a rotated state. An acceleration sensor, a gyroscope sensor, or the like can be used as the orientation detection circuit 55. Using the acceleration sensor or the gyroscope sensor, which is the orientation detection circuit 55, the system controller 50 can also detect a motion of the camera 100 (panning, tilting, lifting, whether it is stationary, and so forth).

Under control of the system controller 50, an out-of-viewfinder display device 43 displays various setting values of the camera, including the shutter speed and the aperture, via an out-of-viewfinder display device driving circuit 44.

A power source controller 80 is composed of a battery detection circuit, a DC-DC converter, a switch circuit for switching among blocks to which current is delivered, and so forth; for example, it detects whether a battery has been loaded, a type of the battery, and a remaining battery level. Furthermore, the power source controller 80 controls the DC-DC converter based on the results of such detections and an instruction from the system controller 50, and supplies necessary voltages to discrete units, including a recording medium 150, for a necessary period of time. A power source 30 is composed of, for example, a primary battery such as an alkaline battery and a lithium battery, a secondary battery such as a NiCd battery, a NiMH battery, and a Li battery, or an AC adapter.

A recording medium I/F 18 is an interface with the recording medium 150, which is a memory card, a hard disk, or the like. The recording medium 150 is a recording medium for recording shot images, such as a memory card, and is composed of a semiconductor memory, a magnetic disk, or the like.

An operation unit 70 is an input unit that accepts an operation from a user (a user operation), and is used to input various types of operation instructions to the system controller 50. As shown in FIG. 2, the operation unit 70 includes a shutter button 61, a mode changeover switch 60, a power source switch 72, a touch panel 70a, other operation members 70b, and so forth. The other operation members 70b include a main electronic dial, a sub electronic dial, four-directional keys, a SET button, a moving image button, an AE lock button, an enlargement button, a reproduction button, a menu button, and so forth.

The shutter button 61 includes a first shutter switch 62 and a second shutter switch 64. While the shutter button 61 is being operated, that is to say, when it is pressed halfway down (a shooting preparation instruction), the first shutter switch 62 is turned ON and generates a first shutter switch signal SW1. Based on the first shutter switch signal SW1, the system controller 50 starts shooting preparation operations such as autofocus (AF) processing, automatic exposure (AE) processing, auto white balance (AWB) processing, and preliminary flash emission (EF) processing.

When the operation on the shutter button 61 has been completed, that is to say, when it is fully pressed down (a shooting instruction), the second shutter switch 64 is turned ON and generates a second shutter switch signal SW2. Based on the second shutter switch signal SW2, the system controller 50 starts a sequence of operations of shooting processing, from readout of signals from the image capturing unit 22 to writing of a captured image into the recording medium 150 as an image file.

The mode changeover switch 60 is a switch for selecting an operation mode of the camera 100. In accordance with a signal from the mode changeover switch 60, the system controller 50 switches the operation mode to one of a still image shooting mode, a moving image shooting mode, a reproduction mode, and the like. Examples of the modes included in the still image shooting mode are: an auto shooting mode, an auto scene distinction mode, a manual mode, an aperture priority mode (Av mode), a shutter speed priority mode (Tv mode), a program AE mode (P mode), and so forth. Other examples are: various types of scene modes in which shooting settings are configured for each shooting scene, a custom mode, and so forth. With use of the mode changeover switch 60, the user can switch directly to one of these modes. Alternatively, it is permissible to, after switching to a screen of a list of shooting modes with use of the mode changeover switch 60, selectively switch to one of the plurality of displayed modes with use of another operation member. Similarly, the moving image shooting mode may also include a plurality of modes.

The touch panel 70a is a touch sensor that detects various types of touch operations performed on a display surface of the display device 28 (an operation surface of the touch panel 70a). The touch panel 70a and the display device 28 can be integrally configured. For example, the touch panel 70a is composed of a material with high transmittance so as not to interfere with display on the display device 28, and is attached to a top layer of the display surface of the display device 28. Also, the system controller 50 associates a position (input coordinates) on the touch panel 70a touched by the user with display coordinates on the display surface of the display device 28, thereby making it possible to determine, for example, which one of menu items has been selected. This makes it possible to provide a graphical user interface (GUI) on which the user can operate a screen displayed on the display device 28 as if directly. The camera 100 has the above-described configuration by way of example; however, whether the shutter 101 is included, whether the lens unit 150 is attachable and detachable, and the configuration of operation members 70 may be different.

Figure 3:
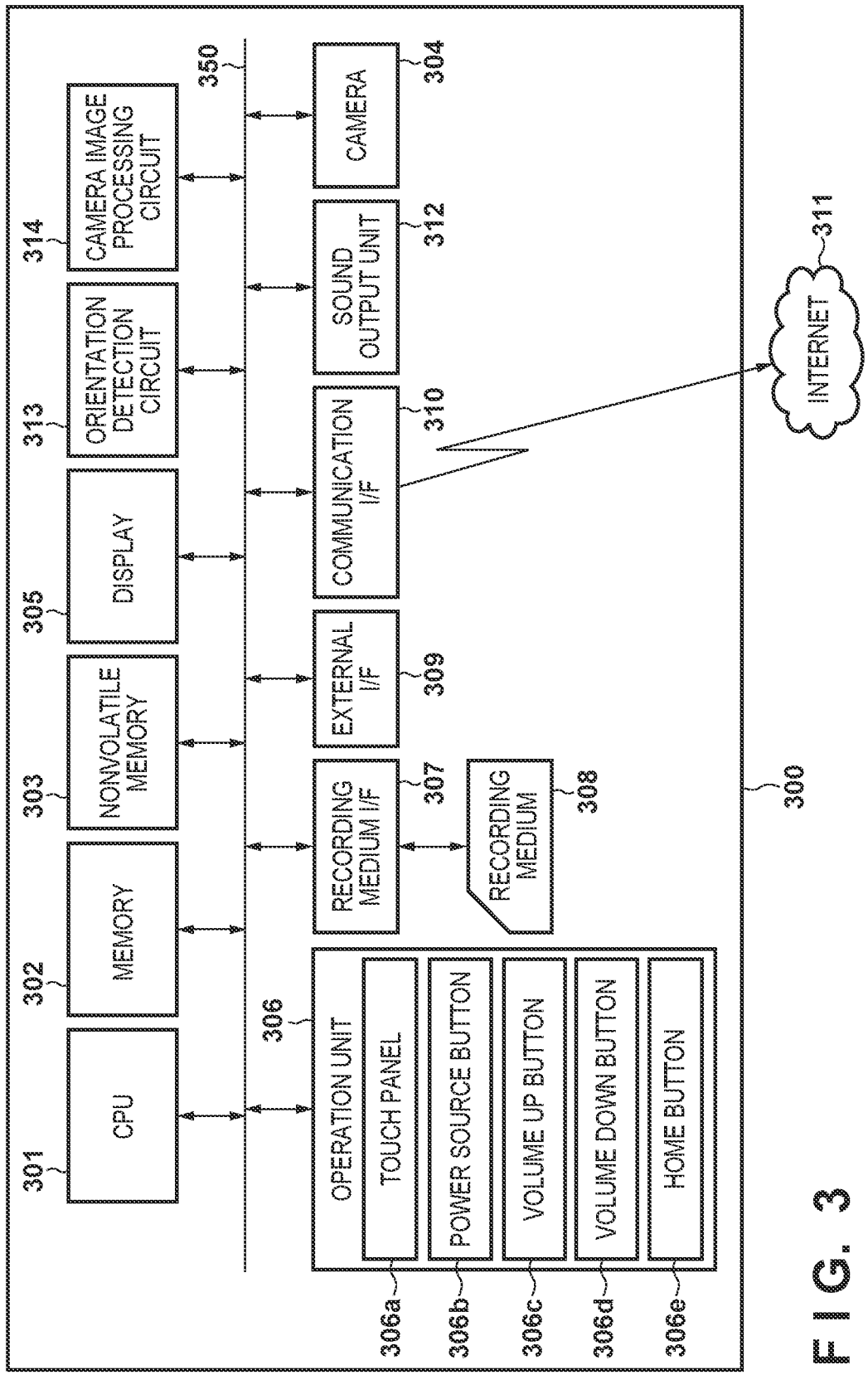
FIG. 3 is a configuration diagram of a smartphone according to the embodiment.

The foregoing has described the basic configuration of the camera 100 according to the embodiment. Next, a configuration of the smartphone 300, which functions as an information processing apparatus according to the embodiment, will be described with reference to FIG. 3.

A CPU 301, a memory 302, a nonvolatile memory 303, a camera 304, a display 305, an operation unit 306, a storage medium I/F 307, a storage medium 308, an external I/F 309, and a communication I/F 310 are connected to an internal bus 350. Furthermore, a sound output unit 312, an orientation detection circuit 313, and a camera image processing circuit 314 are also connected to the internal bus 350. The discrete units connected to the internal bus 350 are configured to be capable of exchanging data with one another via the internal bus 350.

The CPU 301 is a controller that controls the entirety of the smartphone 300, and is composed of at least one processor or circuit. The memory 302 is composed of, for example, a RAM (e.g., a volatile memory that uses a semiconductor element). In accordance with, for example, a program stored in the nonvolatile memory 103, the CPU 301 controls each unit of the smartphone 300 while using the memory 302 as a working memory. The nonvolatile memory 303 stores image data, sound data, other types of data, various types of programs intended for the operations of the CPU 301, and so forth. The nonvolatile memory 303 is composed of, for example, a flash memory, a ROM, or the like. Furthermore, the nonvolatile memory 303 stores and holds setting value information which has been exchanged between a source camera and a target camera in the past and which has been relayed by the smartphone 300 in the past; the details will be described later.

Under control of the CPU 301, the camera image processing circuit 314 applies various types of image processing and subject recognition processing to images shot by the camera 304. The camera image processing circuit 314 can also apply various types of image processing to images stored in the nonvolatile memory 303 and the storage medium 108, video signals obtained via the external I/F 309, images obtained via the communication I/F 310, and the like. It is sufficient that a communication interface used by the communication circuit 310 according to the embodiment be capable of communicating with the camera 100; thus, the type thereof may be either wired or wireless, and it may be any interface.

Under control of the CPU 301, the display 305 displays images, a GUI screen that composes a GUI, and so forth. The CPU 301 generates display control signals in accordance with a program, and controls each unit of the smartphone 300 so as to output the display control signals to the display 305. The display 305 displays a video based on output video signals. Note that the constituents of the smartphone 300 itself may include an interface for outputting video signals to be displayed on the display 305, and the display 305 may be composed of an external monitor (television).

The operation unit 306 is an input device for accepting a user operation, and includes a character information input device such as a keyboard, pointing devices such as a mouse and a touch panel, buttons, dials, a joystick, a touch sensor, a touchpad, and the like. Note that the touch panel is an input device which is overlaid on the display 305 to have a planner structure, and which is configured to output coordinate information corresponding to the touched position. The operation unit 306 includes a touch panel 306a that has been mentioned earlier, a power source button 306b, a volume up button 306c, a volume down button 306d, a home button 306e, and so forth.

The storage medium I/F 307 allows a storage medium such as a memory card, a CD, and a DVD to be attached thereto; it reads out data from the attached storage medium 308 and writes data to this storage medium 308 under control of the CPU 301. The storage medium 308 may be a built-in storage embedded in the smartphone 300. The external I/F 309 is an interface that connects to an external device via a wired cable or wirelessly, and is intended for inputting and outputting of video signals and sound signals. The communication I/F 310 is an interface for exchanging various types of data such as files and commands via communication with an external device (the camera 100 in the embodiment), the Internet 311, and the like.

The sound output unit 312 outputs sounds of moving images and sound data, operation sounds, ringtones, various types of notification sounds, and the like. The orientation detection circuit 313 detects the orientation of the smartphone 300 relative to the gravity direction, and the inclination of the orientation relative to each of the yaw, roll, and pitch axes. Based on the orientation detected by the orientation detection circuit 313, the CPU 301 can distinguish whether the smartphone 300 is held horizontally, is held vertically, faces upward, faces downward, is diagonal in orientation, and so forth. At least one of an acceleration sensor, a gyroscope sensor, a geomagnetic sensor, a direction sensor, an altitude sensor, and the like can be used as the orientation detection circuit 313, and a combination of two or more of them can also be used thereas.

Any of touch panels of various types, such as a resistive film type, a capacitance type, a surface acoustic wave type, an infrared type, an electromagnetic induction type, an image recognition type, and an optical sensor type, may be used as the touch panel 306a. There are a type where the occurrence of a contact on the touch panel is detected, and a type where the occurrence of a touch is detected when a finger or a stylus has been brought into close proximity to the touch panel; either of these types may be used.

The foregoing has described the configuration of the smartphone 300 according to the embodiment.

Figure 4B:
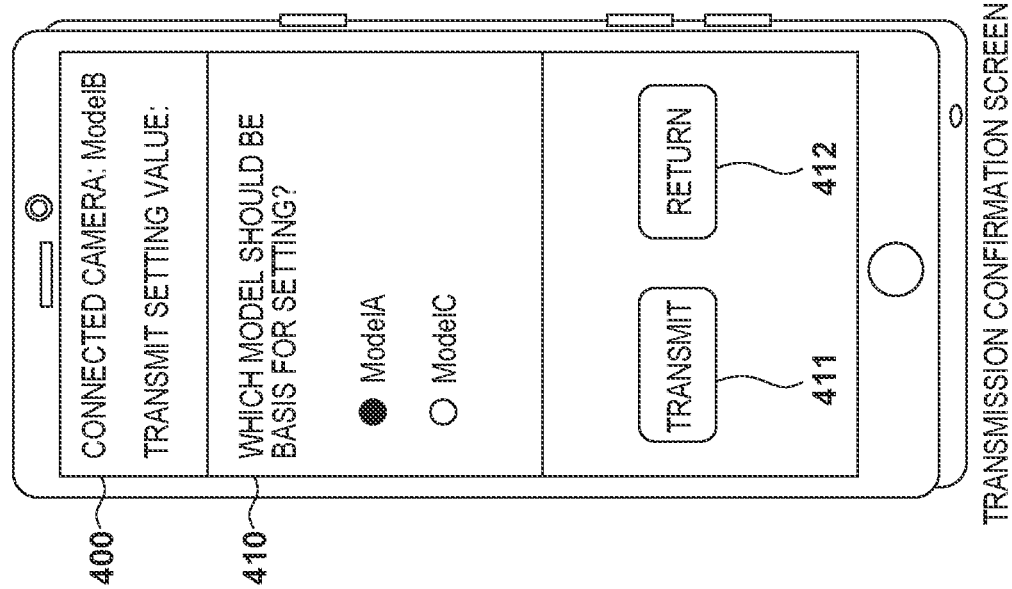
Figure 4A:
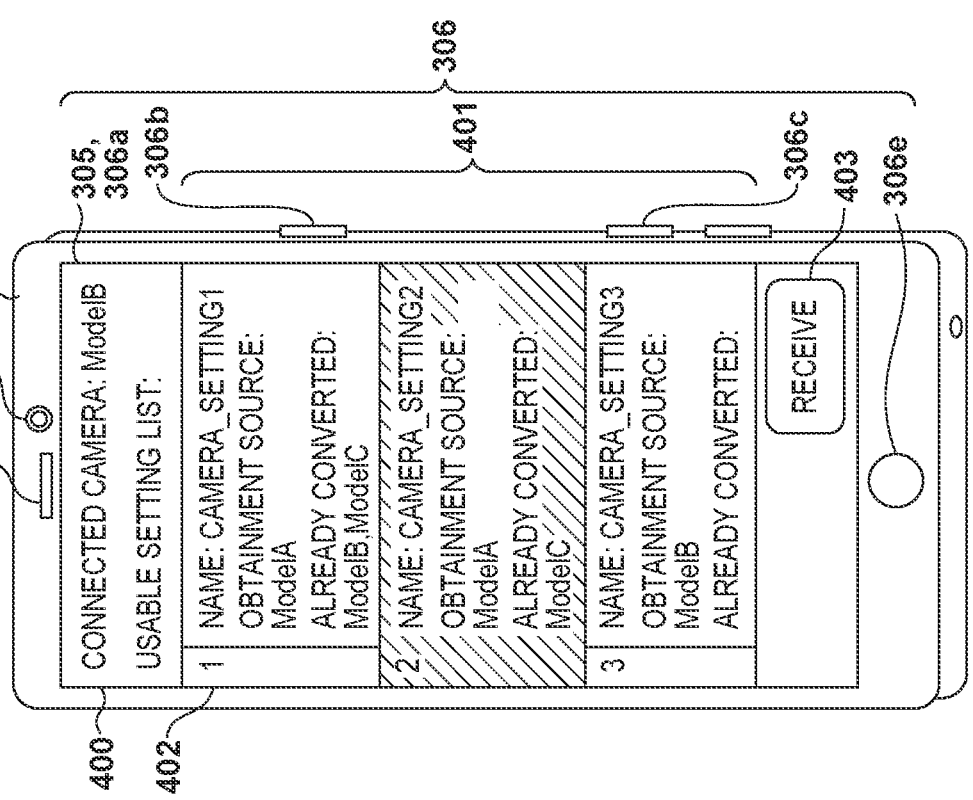

FIG. 4A to FIG. 4C are diagrams showing the arrangement of operation members and displayed screens on the smartphone 300 according to the present embodiment. Especially, a GUI that is being processed by the smartphone 300 is shown.

FIG. 4A is a diagram showing a screen displayed to select a setting value to be transmitted to the camera 100 connected to the smartphone 300. The smartphone 300 displays, on the display 305, a setting status display 400 including information indicating the connected camera 100, and a list 401 related to setting values which are stored and held in the nonvolatile memory 303 and which can be set on the camera 100. This list 401 includes information fields 402 for the respective setting values. Each information field 402 displays a name indicating a setting, an obtainment source camera, and a name of a camera that has actually used the setting before. The information field 402 of the selected setting value is displayed so as to indicate the selected state. Displaying the name of the camera that has actually used the setting before in the information field 402 in this way makes it possible to determine whether it is necessary to correct the setting after it is transmitted to the camera 100.

A reception button 403 is a button that is intended for the smartphone 300 to control a request for obtainment of setting value data to the camera 100. When the user touches this reception button, the CPU 301 transmits a request for obtainment of setting value data to the connected camera 100, receives information thereof, and records the information into the nonvolatile memory 303. In this case, the camera 100 acts as a source camera; however, it is to be noted that, in the embodiment, the camera 100 is described as a target camera.

FIG. 4B is a screen for selecting a setting value. This is a diagram showing a screen displayed to operate an instruction for transmitting the setting value when any information field 401 has been tapped on the touch panel 306a. The CPU 301 displays the models associated with the setting value as a plurality of radio buttons on a base model selection display 410 for the setting, and a model is determined by the user tapping the touch panel 306a. When the user has tapped a transmission button 411 on the touch panel 306a, the CPU 301 transmits the setting value of the model selected on the base model selection display 410 to the camera 100. On the other hand, when the user has tapped the touch panel 306a by selecting a return button 412, the CPU 301 causes the GUI to return to the previous screen.

FIG. 4C is a screen for selecting a setting value. Upon detecting double-tapping in any information field 401 of the GUI screen of FIG. 4A on the touch panel 306a, the CPU 301 displays an information display screen of the setting value. A setting value information display field 420 displays information of the selected setting value. The information includes a model that is an obtainment source of the setting value, and a model that has actually used the setting value before. Furthermore, in a case where, for example, the setting value has been corrected in the model that has actually used the setting value before and therefore a difference exists between the changed setting value and the setting value of the model that is the obtainment source model, the changed setting is displayed. In the present embodiment, a name of a group including a setting value that exhibits the difference is displayed. Any method may be used as the method of displaying the difference. When the user has tapped the touch panel 306a by selecting a set button 411, a screen for operating a transmission instruction is displayed. On the other hand, the user's tapping on the touch panel 306a via selection of a return button 422 will return to the previous screen.

FIG. 4C shows an exemplary display for a case where the "AF" settings and the "button" settings are different as examples of the difference. Under the "AF" settings, there are, for example, driving methods that represent [one-shot driving] for focusing once and [servo driving] for tracking when pressed, an AF frame selected from among a [1-point] AF frame that is normally an initial setting, [spot] representing a small frame, and [zone] representing a large frame, a position setting for the AF frame, and the like. For example, in a case where the setting on the obtainment source model is the [spot] AF frame but [spot] cannot be selected on a target model, the setting is converted into [1-point], which is the initial setting. In this way, in a case where one of the "AF" settings differs between the setting on the obtainment source model and the setting to be handed over, the presence of the difference is displayed. The "button" settings are settings indicating the combinations of a button and an assigned function that are included in the camera 300. For example, a [still image shooting] setting for recording a still image and a [moving image recording] setting for recording moving images can be assigned to and used via the second shutter switch. There are cases where the combinations of a button and a possible setting vary depending on models; in a case where the combinations of a button and a setting included in the setting of the obtainment source model are not possible in a target, the setting is converted into the value of the initial setting of the target model. In this way, in a case where one of the "button" settings differs between the setting on the obtainment source model and the setting to be handed over, the presence of the difference is displayed.

FIG. 4D is a diagram showing a screen at the time of reception after the reception button 403 has been pressed. A setting value list 421 is a display of a list of setting values held in the smartphone. This list 421 includes information fields 422 for the respective setting values. Each information field 422 displays a name indicating a setting, a camera from which the setting has been obtained, and a name of a camera that has actually used the setting before. A new button 423 for issuing an instruction for newly storing the received setting value is displayed. Upon detecting double-tapping in each information field 422 on the touch panel 306a, the CPU 301 stores the received setting value in association with the selected setting value. Then, upon detecting the user's tap operation on the new button 423, the CPU 301 newly stores the received setting value.

Next, a method of storing setting values and models in association with one another will be described with reference to FIG. 5A and FIG. 5B.

Figure 5A:
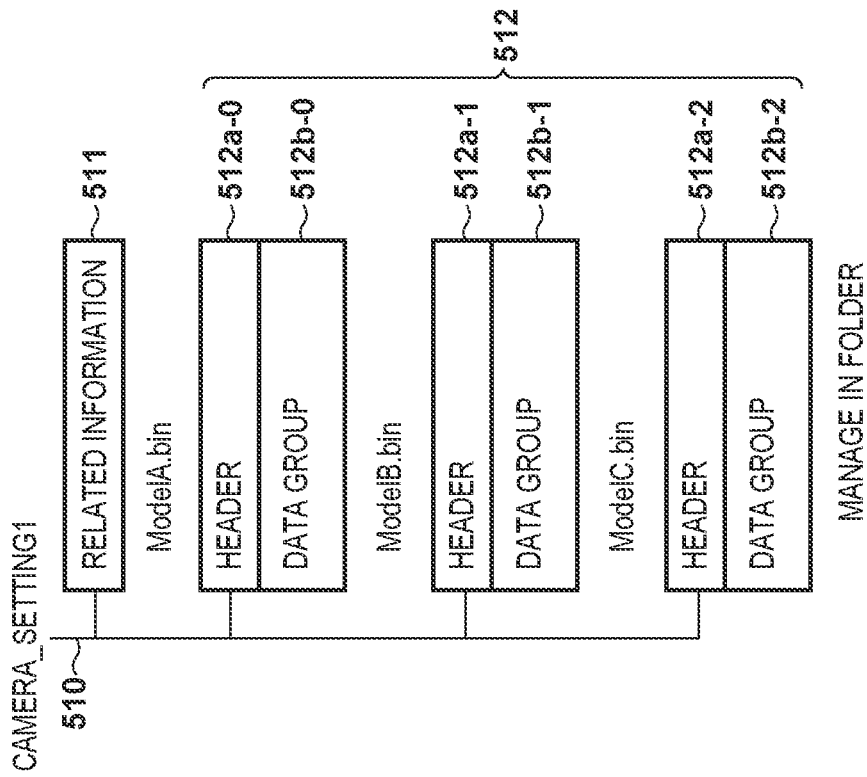
FIG. 5A and FIG. 5B are diagrams for describing association between a setting value and a model according to the embodiment.

FIG. 5A is a diagram showing a file configuration 500 in which setting values of a plurality of models are stored in association with one another as one file. The file configuration 500 is composed of a file header 501 including structure information of the file, and one or more setting value lists 502. The file header 501 is composed of information that includes an identifier indicating a structure of the file and identifiers indicating data. In the setting value list 502, setting values are configured as a list, in which pieces of data including setting value data 502b-i obtained from each model (i=0, 1, 2 . . . ) and a setting value information header 502a-i added thereto is handled as one pair. The setting value information header 502a-i is composed of information that includes at least a model ID associated with the pertinent setting values 502b, an identifier indicating whether this model is the base of the setting file, a version of the setting values 502b, a size of the setting values 502b, and an identifier indicating whether the setting values 502b-i are the settings representing differences from the base. The settings representing the differences are setting information that includes only a part of setting values held in the camera. The setting values 502b-i are setting values obtained from the camera 100. In a case where the obtained setting values are the differences, an identifier indicating the settings representing the differences is set in the pertinent setting value information header 502a.

Here, it is assumed in the embodiment that the first data in the setting value lists 502 (the header 502a-0 and the setting value data 502b-0) is data obtained from a camera that is a source of the setting values. Also, the second and subsequent data pairs "502a-1, 502b-1", "502a-2, 502b-2", . . . in the setting value lists 502 are data whose settings have been completed in targets in the past.

For example, assume that a camera that is a source of the setting value data is ModelA, and this setting value data has been reflected in the past in cameras ModelB and ModelC, which are targets. In this case, an example in which this setting value data is displayed in a selectable manner is the first information in the list 401 on the display screen of FIG. 4A. In this figure, "CAMERA_SETTING1" is displayed as the setting value data, "ModelA" is displayed as an obtainment source, and "ModelB" and "ModelC" are displayed as models in which conversion has already been performed.

Figure 5B:
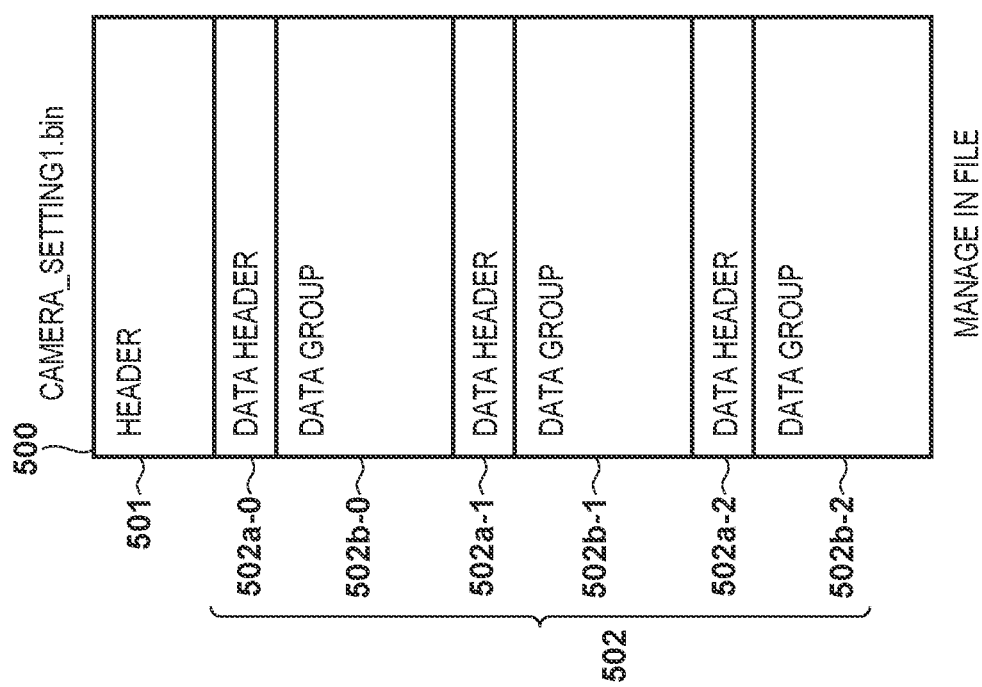

FIG. 5B is a diagram showing a folder configuration 510 in which setting values of a plurality of models are represented by a folder tree and stored in association with one another. The folder configuration 510 is composed of a structure information file 511 including structure information of a folder, and one or more setting value file groups 512. The structure information file 511 is composed of information including an identifier indicating a structure of the folder and identifiers indicating data. The setting value file group 512 manages a file group in which information including setting value data 512b obtained from each model and a setting value information header 512a added thereto is handled as one file. The setting value information header 512a is composed of information that includes at least a model ID associated with the pertinent setting values 512b, an identifier indicating whether this model is the base of the setting file, a version of the setting values 512b, a size of the setting values 512b, and an identifier indicating whether the setting values 512b are the settings representing differences from the base. The setting values 512b are setting values obtained from the camera 100. When the obtained setting values have been determined to be the differences, an identifier indicating the settings representing the differences is set in the setting value information header 512a. To provide the description in connection with FIG. 5A, the header 512a-0 and the data group 512b-0 represent data obtained from a camera that is a source of the setting value data, and the "header 512a-1, data group 512b-1" and the "header 512a-2, data group 512b-2" represent data that has been reflected in target cameras in the past.

Although the setting values and data of cameras are associated in accordance with the above-described configuration in the present embodiment, it is permissible to utilize a management method that uses any association means such as assigning of a tag to data.

FIG. 6A is a diagram showing communication information that is used in communication between the smartphone and the camera according to the present embodiment. Setting value data, a setting value identifier, a setting value Version, and request information are used as data that is transmitted and received. The setting value data is a group of setting values of the camera, and is data that is communicated, for example, when the setting data is transmitted to the camera and when the settings are received from the camera. The setting value identifier is data which may be appended to the setting data when the setting values managed on the smartphone are transmitted to the camera and when the setting data is received from the camera, and which is used to specify the setting values that are managed under the setting value data. The setting value Version is data which may be appended to the setting data when the setting values managed on the smartphone are transmitted to the camera and when the setting data is received from the camera, and which is used to specify the version of the setting data of the managed setting values. The request information is data for specifying information (Get) that is intended to specify that the smartphone has requested the camera for data, and whether a request is from the smartphone (Get) or from the camera (Put) when receiving the setting data from the camera. Note that the setting value identifier and the setting value Version may have invalid values; it is assumed in the present embodiment that such values are represented by −1.

FIG. 6B is a diagram showing the combinations of management methods that are controlled based on the combination of transmitted/received data pieces when the setting data is received from the camera in the present embodiment. The operations are categorized into the following four types depending on the combination: normal association, forced association, new storage, and control on the smartphone.

The normal association is an operation in which, when the setting data to be managed on the smartphone can be specified based on the received setting value identifier and setting value Version, the setting value data and the version are updated. The normal association is automatically actuated in a case where the setting values to be managed on the smartphone can be specified based on the received setting value identifier and setting value Version when the camera has made a transmission request.

The forced association is an operation in which, when the setting values to be managed on the smartphone can be specified based on the received setting value identifier and the setting value Version has not been designated, the setting data and the version are updated irrespective of the version of the setting value data to be managed. The forced association is automatically actuated in a case where the setting values to be managed on the smartphone can be specified based on the received setting value identifier and the setting value Version has not been designated when the camera has made a transmission request.

In the new storage, the setting data is stored as new setting values when the received setting value identifier and setting value Version have not been designated. The new storage is automatically actuated in a case where the received setting value identifier and setting value Version have not been designated when the camera has made a transmission request.

The control on the smartphone is an operation that is performed when the smartphone has made an obtainment request; any operation such as the new storage, the normal association, and the forced association can be performed thereas by manipulating the smartphone. Although the operations are controlled based on the aforementioned combinations in the present embodiment, any other operations may be performed.

Figure 7A:
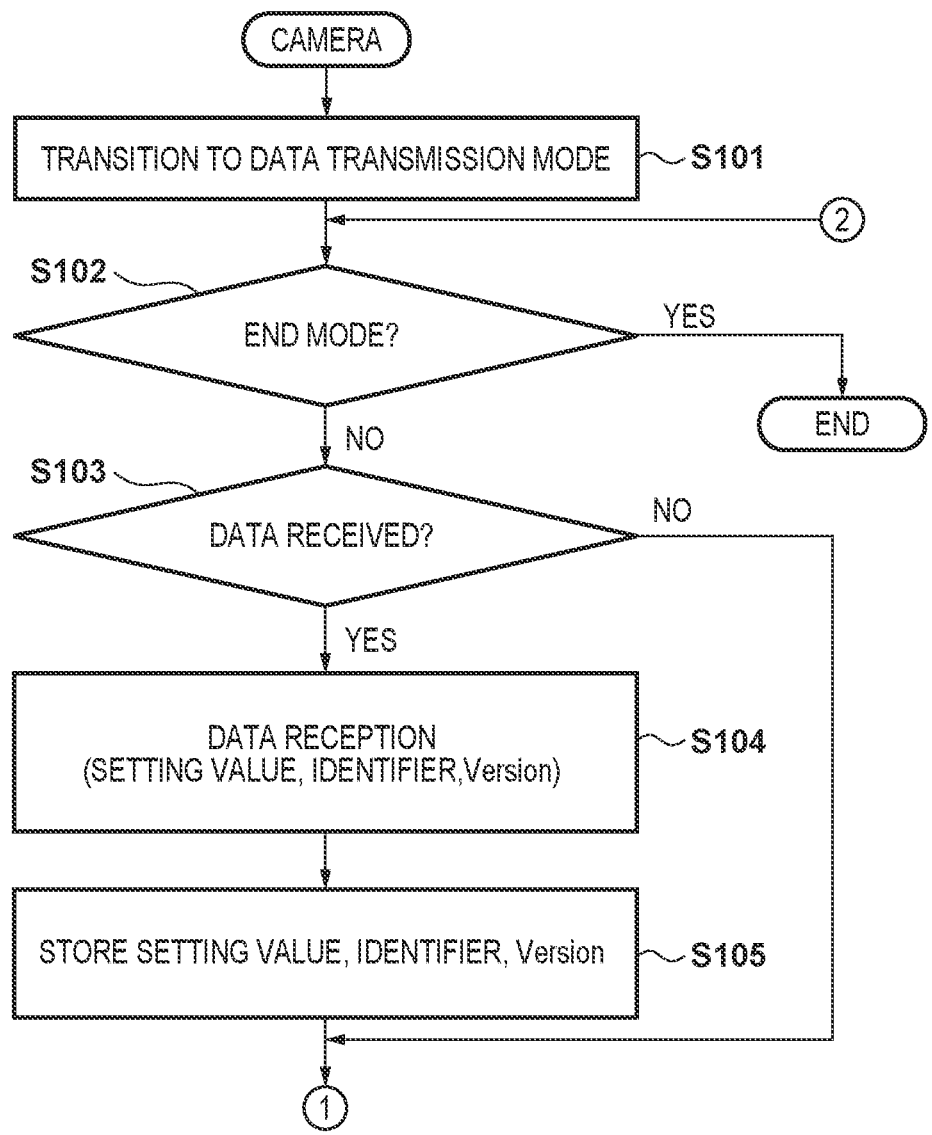
FIGS. 7A and 7B are flowcharts showing the content of processing of the camera according to the embodiment.
Figure 7B:
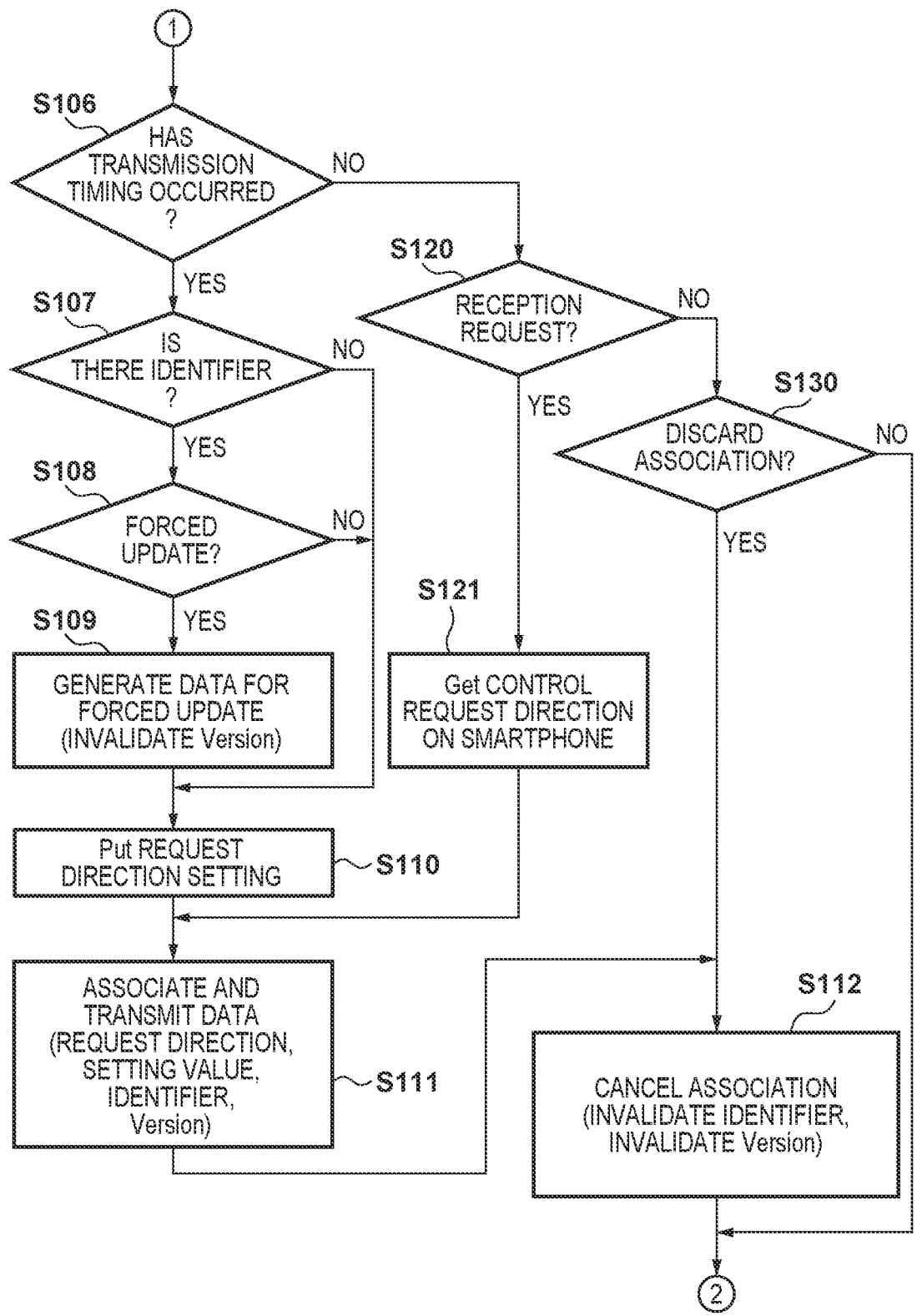

FIGS. 7A and 7B are flowcharts showing the content of processing related to setting values, which is executed by the system controller 50 of the camera 100 according to the present embodiment. A program corresponding to these flowcharts is stored in the nonvolatile memory 56.

In step S101, the system controller 50 transitions to a data transmission mode. It is assumed that the transition to this mode is made when, for example, communication connection between the smartphone and the camera has been established after the user has selected, via the touch panel 70a, an item related to a setting value within a menu displayed on the display device 28.

In step S102, the system controller 50 determines whether the user has issued an instruction for ending the mode. In a case where the system controller 50 has determined that the instruction for ending the mode has been issued, it ends the processing for this mode. On the other hand, in a case where the system controller 50 has determined that the instruction for ending the mode has not been issued, the processing proceeds to step S103.

In this step S103, the system controller 50 determines whether setting data has been received from the smartphone. In a case where the system controller 50 has determined that setting data has been received from the smartphone, the processing proceeds to step S104; in a case where it has determined that setting data has not been received, the processing proceeds to step S106.

In step S104, the system controller 50 receives setting value data, a setting value identifier, and a setting value Version from the connected smartphone. Then, in step S105, the system controller 50 reflects the setting value data in the camera settings, and also stores the setting value identifier and the setting value Version into, for example, the nonvolatile memory 56.

In step S106, the system controller 50 determines whether the current timing is the timing to transmit a setting completion notification from the camera. In a case where the system controller 50 has determined that the current timing is the timing to transmit the setting completion notification, the processing proceeds to step S107; in a case where it has determined that the current timing is not that timing, the processing proceeds to step S120. It is assumed that this timing of the setting completion notification is the timing of reception of the setting value data, the first power-OFF operation after the reception, an explicit transmission instruction issued via a user operation, or when an operation to shoot such contents as still images and moving images has been performed for the first time after the reception.

In step S107, the system controller 50 determines whether the setting value identifier has been held. In a case where the system controller 50 has determined that the setting value identifier has been held, the processing proceeds to step S108; in a case where it has determined that the setting value identifier has not been held, the processing proceeds to step S110.

In step S108, the system controller 50 determines whether to perform transmission to forcibly update the association. Note that whether to forcibly update the association is determined based on whether the explicit instruction via the user operation or the setting value Version has been invalidated. In a case where the system controller 50 has determined that the transmission to forcibly update the association is to be performed, the processing proceeds to step S109; in a case where the it has determined that the transmission is not to be performed, the processing proceeds to step S110.

In step S109, the system controller 50 invalidates the held setting value Version, and the processing proceeds to step S110.

In step S110, the system controller 50 sets Put as the request direction. Thereafter, in step S111, the system controller 50 transmits data including the combination of the setting value data, the stored setting value identifier (including an identification for identifying the electronic device of itself), the setting value Version, and the request direction to the smartphone.

Thereafter, in step S112, the system controller 50 cancels the association of the setting value by clearing the setting value identifier and the setting value Version, and the processing returns to step S102.

In step S120, the system controller 50 determines whether a request for reception of the setting data has been received from the smartphone. In a case where the system controller 50 has determined that this request has been received, the processing proceeds to step S121; in a case where it has determined that this request has not been received, the processing proceeds to step S130.

In step S121, the system controller 50 sets Get as the request direction, and the processing proceeds to step S111.

In step S130, the system controller 50 determines whether an operation to discard the association has been performed. The operation to discard the association is an operation to change the setting values collectively, such as an operation to collectively initialize the setting values of the camera, and readout of the setting values from a medium like a card. In a case where the system controller 50 has determined that the operation to discard the association has been performed in step S130, the processing proceeds to step S112; in a case where it has determined that the operation has not been performed, the processing returns to step S102.

In step S112, the system controller 50 cancels the association (invalidates the identifier and the setting value Version), and the processing returns to step S102.

Figure 8A:
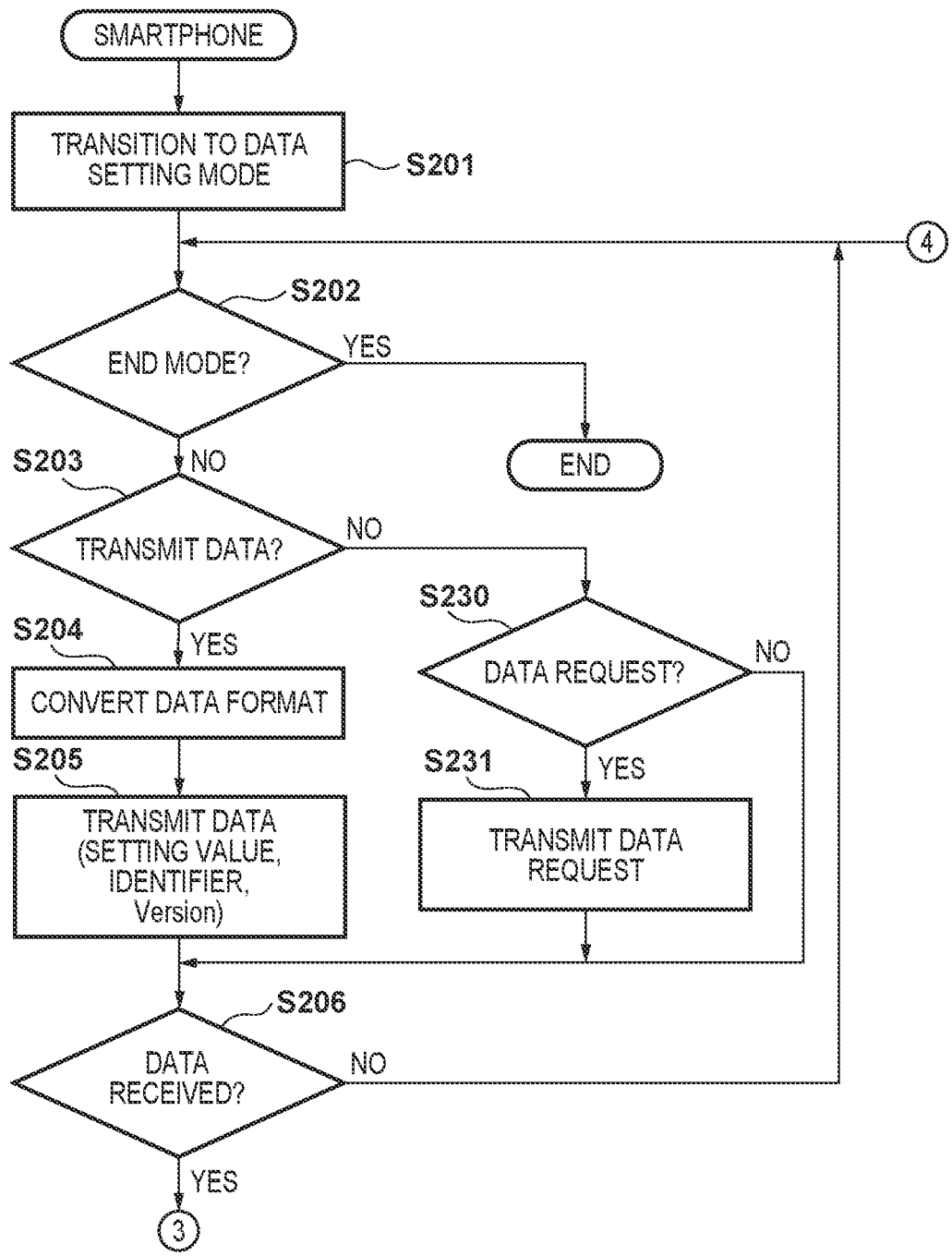
FIGS. 8A and 8B are flowcharts showing the content of processing of the smartphone according to the embodiment.
Figure 8B:
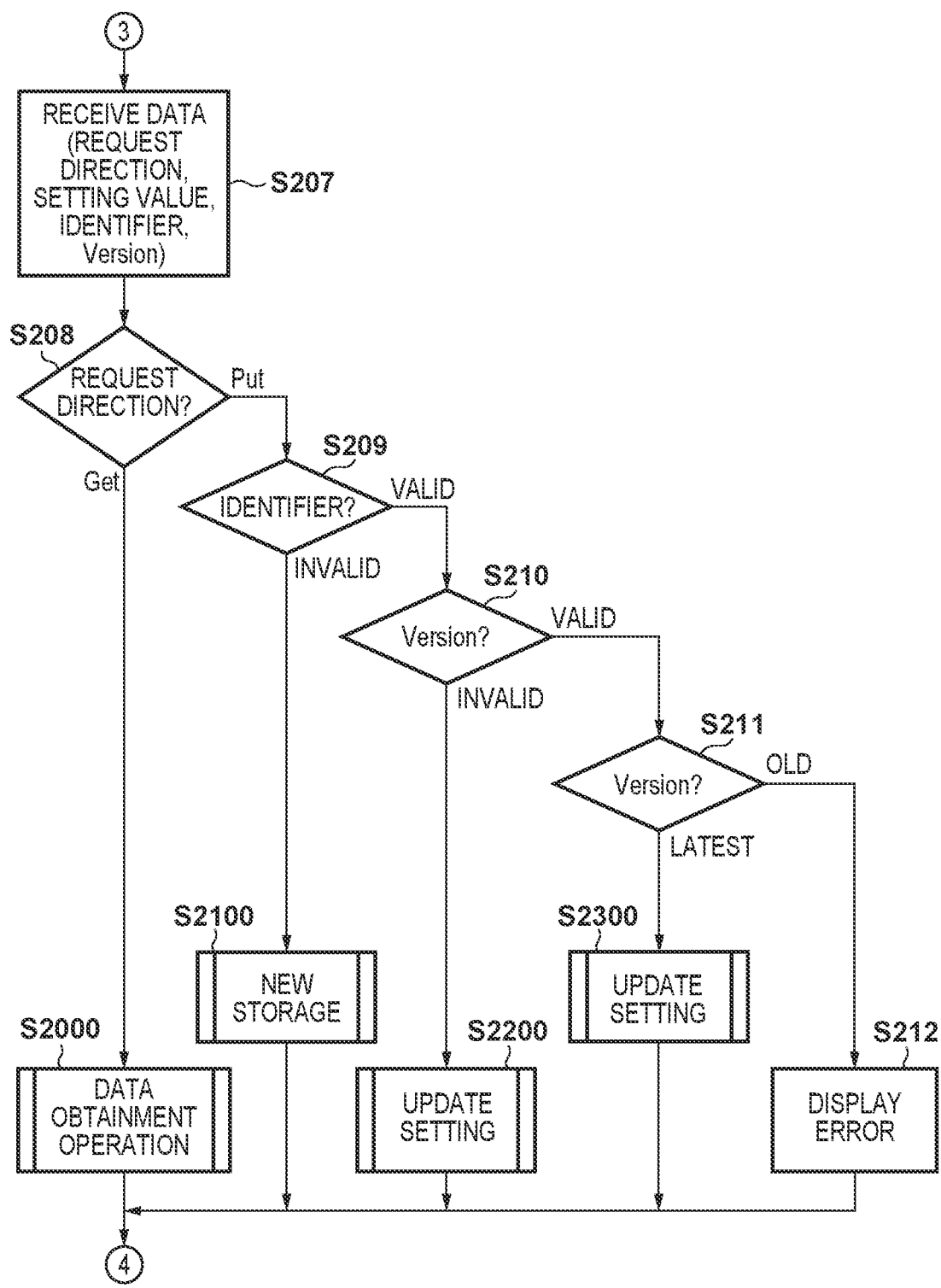

Next, processing of the CPU 301 of the smartphone according to the present embodiment will be described with reference to flowcharts of FIGS. 8A and 8B. A program related to these figures is stored in the nonvolatile memory 303.

In step S201, the CPU 301 transitions to a data setting mode. It is assumed that the transition to the data setting mode can be made by activating a corresponding application via a user's operation on the operation unit 306 and by performing an operation on this application.

In step S202, the CPU 301 determines whether the user has issued an instruction for ending this mode. In a case where the CPU 301 has determined that the ending instruction has been issued, the present processing is ended; in a case where it has determined that the ending instruction has not been issued, the processing proceeds to step S203.

In step S203, the CPU 301 determines whether an instruction for data transmission has been issued, that is to say, whether the transmission button 411 has been pressed. In a case where the CPU 301 has determined that the instruction for data transmission has been issued, the processing proceeds to step S204; in a case where it has determined that the instruction for data transmission has not been issued, the processing proceeds to step S230.

In step S204, the CPU 301 converts selected setting data into a format that can be received by the camera with which communication is currently performed. Then, in step S205, the CPU 301 transmits the converted setting data, the setting value identifier, and the setting value Version to the camera, and the processing proceeds to step S206.

In step S230, the CPU 301 determines whether a data obtainment request has been made, that is to say, whether the reception button 403 has been pressed. In a case where the CPU 301 has determined that the data obtainment request has been made, the processing proceeds to step S231; in a case where it has determined that the data obtainment request has not been made, the processing proceeds to step S206.

In step S231, the CPU 301 sets Get as the request direction and transmits a setting value data obtainment request to the camera, and the processing proceeds to step S206.

In step S206, the CPU 301 determines whether setting data has been received from the camera. In a case where the CPU 301 has determined that the setting data has been received, the processing proceeds to step S207; in a case where it has determined that the setting data has not been received, the processing returns to step S202.

In step S207, the CPU 301 receives and stores a request direction, setting value data, a setting value identifier, and a setting value Version. Thereafter, in step S208, the CPU 301 determines whether the received request direction is Get or Put. In a case where the CPU 301 has determined that the request direction is Get, the processing proceeds to step S2000; in a case where it has determined that the request direction is Put, the processing proceeds to step S209.

In step S2000, the CPU 301 calls up a subroutine for performing a data obtainment operation.

In step S209, the CPU 301 determines whether the received setting value identifier is valid. In a case where the CPU 301 has determined that the setting value identifier is invalid (−1), the processing proceeds to step S2100; in a case where it has determined that the setting value identifier is valid, the processing proceeds to step S210.

In step S2100, the CPU 301 calls up a subroutine for newly storing the setting value.

In step S210, the CPU 301 determines whether the received setting value Version is valid. In a case where the CPU 301 has determined that the setting value Version is invalid, the processing proceeds to step S2200 to forcibly update the setting value. On the other hand, in a case where the CPU 301 has determined that the setting value Version is valid, the processing proceeds to step S211.

In step S2200, the CPU 301 calls up a subroutine for updating the setting value.

In step S211, the CPU 301 determines whether the setting value Version is the latest version. In the embodiment, it is assumed that the setting data managed based on the setting value identifier and the model ID of the camera 100 is obtained and compared with the associated setting value Version, and the setting value Version is determined to be the latest version if they match and is not determined to be the latest version if they do not match. In a case where the CPU 301 has determined that the setting value Version is the latest version, the processing proceeds to step S2300; in a case where it has determined that the setting value Version is not the latest, the processing proceeds to step S212.

In step S2300, the CPU 301 calls up a subroutine for updating the setting.

In step S212, the CPU 301 displays a communication indicating that the processing ended with an error on the display 300.

In a case where the processing of step S2000, S2100, S2200, S2300, or S212 has been ended, the CPU 301 causes the processing to return to step S202.

Next, the subroutines used by the CPU 301 of the smartphone 300 according to the present embodiment will be described with reference to FIG. 9A to FIG. 9C.

FIG. 9A is a flowchart showing the subroutine S2000, which represents the data obtainment operation.

In step S2001, the CPU 301 displays a data obtainment screen shown in FIG. 4D. Then, in step S2002, the CPU 301 determines whether associated storage is to be performed. The CPU 301 determines that associated storage is to be performed in a case where each information field 422 has been double-tapped, and determines that new storage is to be performed in a case where the new button 423 has been tapped. In a case where the CPU 301 has determined that associated storage is to be performed, it proceeds to step S2200 and calls up the subroutine for updating the setting. On the other hand, in a case where the CPU 301 has determined that new storage is to be performed, it proceeds to step S2100 and calls up the subroutine for newly storing the setting value.

FIG. 9B is a flowchart showing the subroutine of step S2100 for newly storing the setting value.

In step S2101, the CPU 301 determines whether the received data is difference data. In a case where the CPU 301 has determined that the received data is not the difference data, the processing proceeds to step S2102; in a case where it has determined that the received data is the difference data, the processing proceeds to step S2103. In step S2102, the CPU 301 generates a new file by generating an identifier based on the setting value data received in step S2102, setting the setting value Version at 0, generating a data header 502a from the setting data and the model ID, and associating them with the received setting value data. It is assumed that the identifier is obtained by calculating a hash value or the like. Also, in step S2103, the CPU 301 displays a screen indicating that the processing ended with an error on the display 300.

FIG. 9C is a flowchart showing the subroutine of step S2200 (step S2300 is the same as well) for updating the setting value.

In step S2201, the CPU 301 searches for a setting value based on the received setting value identifier (including the model name of the target electronic device that reflects setting information). Then, in step S2202, the CPU 301 updates the setting value by storing, as the setting value, the received setting data under setting data 502b associated with the model ID, and setting the received setting value Version as the setting value Version of the header 502a.

Implementing the above-described configuration makes it possible to determine whether a setting value managed by the smartphone 300 has been actually used before on the camera 100; this facilitates the user's selection of a setting value to be used with respect to the camera 100. Although the present specification incorporates the above-described embodiment, a configuration that uses any electronic device, association means, and communication means may be used in the implementation.

Note that in the above-described embodiment, cameras are examples of source and target electronic devices, and model names are used as information for identifying them; however, the types of the electronic devices are not limited to cameras. Furthermore, information that identifies the electronic devices is not limited to the model names. For example, in a case where the user can freely give names to the electronic devices, these names may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-72666, filed on Apr. 26, 2023, which is hereby incorporated by reference herein in its entirety.

What is claimed is:

1. An information processing apparatus, comprising:
   a storage device that stores first setting information in association with an identification of a first electronic device, the first setting information having been set on the first electronic device and received from the first electronic device via a communication circuitry;
   a display device that displays a list of pieces of setting information stored in the storage device in a selectable manner; and
   a setting controller that transmits setting information that has been selected from the list to a second electronic device via the communication circuitry for setting on the second electronic device, the second electronic device being different from the first electronic device, wherein
   in a case where information indicating a completion of the setting has been received from the second electronic device after the selected setting information has been transmitted to the second electronic device, the setting controller updates the storage device by associating second setting information and an identification of the second electronic device that have been received from the second electronic device with the selected setting information stored in the storage device, and the list of pieces of setting information displayed on the display device includes pieces of information related to the first electronic device and the second electronic device.

2. The information processing apparatus according to claim 1, wherein in a case where the second setting information is difference data related to a setting, the setting controller updates the storage device by associating the difference data, the identification of the second electronic device, and information indicating that the second setting information represents a difference with the selected setting information.

3. The information processing apparatus according to claim 1, wherein in a case where the second setting information is associated with the selected setting information, the display device provides a display for selecting which one of the first setting information and the second setting information is to be transmitted to the second electronic device.

4. The information processing apparatus according to claim 1, wherein pieces of version information are associated with the pieces of setting information stored in the storage device, and when transmitting the setting information to the second electronic device, the setting controller also transmits version information associated with the setting information.

5. The information processing apparatus according to claim 1, wherein the first electronic device and the second electronic device are cameras.

6. A control method for an information processing apparatus that includes storage device that stores first setting information in association with an identification of a first electronic device, the first setting information having been set on the first electronic device and received from the first electronic device via communication circuitry, the control method comprising:

displaying a list of pieces of setting information stored in the storage device in a selectable manner;

transmitting setting information that has been selected from the list of pieces of setting information to a second electronic device via the communication circuitry for setting on the second electronic device, the second electronic device being different from the first electronic device; and in a case where information indicating a completion of the setting has been received from the second electronic device, updating the storage device by associating second setting information and an identification of the second electronic device that have been received from the second electronic device with the selected setting information stored in the storage device, wherein the list of pieces of setting information includes pieces of information related to the first electronic device and the second electronic device.

7. A non-transitory computer-readable medium storing a program that, when executed by a computer, causes the computer to perform a control method for an information processing apparatus that includes storage device that stores first setting information in association with an identification of a first electronic device, the first setting information having been set on the first electronic device and received from the first electronic device via communication circuitry, the control method comprising:

displaying a list of pieces of setting information stored in the storage device in a selectable manner;

transmitting setting information that has been selected from the list of pieces of setting information to a second electronic device via the communication circuitry for setting on the second electronic device, the second electronic device being different from the first electronic device; and in a case where information indicating a completion of the setting has been received from the second electronic device, updating the storage device by associating second setting information and an identification of the second electronic device that have been received from the second electronic device with the selected setting information stored in the storage device, wherein the list of pieces of setting information includes pieces of information related to the first electronic device and the second electronic device.

* * * * *